United States Patent
Olsen et al.

(10) Patent No.: US 10,430,435 B2
(45) Date of Patent: Oct. 1, 2019

(54) PROVENANCE TRACKING AND QUALITY ANALYSIS FOR REVENUE ASSET MANAGEMENT DATA

(71) Applicant: ServiceSource International, Inc., Denver, CO (US)

(72) Inventors: Greg Olsen, Menlo Park, CA (US); Ganesh Bell, San Francisco, CA (US); Ricardo Craft, Oakland, CA (US); Chellah Thirunavukkarasu, Fremont, CA (US); Lenin Subramanian, San Mateo, CA (US); Manohar Raghunath, Fremont, CA (US); Zheng Chen, South San Francisco, CA (US)

(73) Assignee: ServiceSource International, Inc., San Francisco, CA (US)

( * ) Notice: Subject to any disclaimer, the term of this patent is extended or adjusted under 35 U.S.C. 154(b) by 311 days.

(21) Appl. No.: 13/842,035

(22) Filed: Mar. 15, 2013

(65) Prior Publication Data

US 2014/0114818 A1    Apr. 24, 2014

Related U.S. Application Data

(60) Provisional application No. 61/661,299, filed on Jun. 18, 2012.

(51) Int. Cl.
*G07B 17/00*     (2006.01)
*G06F 16/26*     (2019.01)
(Continued)

(52) U.S. Cl.
CPC .............. *G06F 16/26* (2019.01); *G06F 8/10* (2013.01); *G06F 8/20* (2013.01); *G06F 8/60* (2013.01);
(Continued)

(58) Field of Classification Search
CPC .............. G06Q 40/12; G06Q 10/0631; G06Q 30/0202; G06F 16/24573; G06F 16/24556
(Continued)

(56) References Cited

U.S. PATENT DOCUMENTS 5,530,863 A * 6/1996 Hino ...................... G06F 8/311
                                                           717/141
5,550,734 A   8/1996 Tarter et al.
(Continued)

OTHER PUBLICATIONS

ServiceSource Launches eCommerce Cloud Application. *ServiceSource*. Mar. 18, 2011. [online]. Retrieved on May 18, 2014. Retrieved from the internet <http://files.shareholdercom/downloads/ABEA-5LUUYL/3185849553x0x469467/674f7951-83ba-4692-97bd-3efbc99b32b4/SREV_News_2011_5_17_General_Releases.pdf>.
(Continued)

*Primary Examiner* — Rokib Masud
(74) *Attorney, Agent, or Firm* — Sheridan Ross P.C.

(57) ABSTRACT

In a recurring revenue management system, a first unit of data and a second unit of data is received. Content is extracted from the first unit of data and the second unit of data based on one or more parameters of a predefined data object that is part of an asset data model. The extracted content is added to an instance of the predefined data object, and a reference tag with identification information for its associated content is associated with the content extracted from each of the first unit of data and the second unit of data. A duplicate data condition can be detected and resolved by applying a predefined approach to conflict resolution based on the identification information in the reference tags of the content of the first unit of data and the second unit of data. Related methods, systems, and computer program products are also described.

20 Claims, 11 Drawing Sheets

(51) Int. Cl.
| | |
|---|---|
| *G06Q 10/06* | (2012.01) |
| *G06F 8/60* | (2018.01) |
| *G06F 8/10* | (2018.01) |
| *G06F 8/20* | (2018.01) |
| *G06F 16/84* | (2019.01) |
| *G06F 16/215* | (2019.01) |
| *G06F 16/245* | (2019.01) |
| *G06F 16/2455* | (2019.01) |
| *G06F 16/2457* | (2019.01) |
| *G06Q 40/00* | (2012.01) |
| *G06Q 30/02* | (2012.01) |
| *G06Q 10/00* | (2012.01) |
| *H04L 29/06* | (2006.01) |

(52) U.S. Cl.
CPC .......... *G06F 16/215* (2019.01); *G06F 16/245* (2019.01); *G06F 16/24556* (2019.01); *G06F 16/24573* (2019.01); *G06F 16/86* (2019.01); *G06Q 10/00* (2013.01); *G06Q 10/0631* (2013.01); *G06Q 30/0202* (2013.01); *G06Q 30/0264* (2013.01); *G06Q 30/0277* (2013.01); *G06Q 40/12* (2013.12); *H04L 63/10* (2013.01)

(58) Field of Classification Search
USPC .......................................................... 705/30
See application file for complete search history.

(56) References Cited

U.S. PATENT DOCUMENTS

| | | | |
|---|---|---|---|
| 5,704,044 A | 12/1997 | Tarter et al. | |
| 6,131,085 A | 10/2000 | Rossides | |
| 6,473,794 B1 | 10/2002 | Guheen et al. | |
| 6,721,713 B1 | 4/2004 | Guheen et al. | |
| 7,191,183 B1 | 3/2007 | Goldstein | |
| 7,315,826 B1 | 1/2008 | Guheen et al. | |
| 7,425,700 B2 | 9/2008 | Stults et al. | |
| 8,001,013 B2 | 8/2011 | Serbanescu | |
| 8,010,404 B1 | 8/2011 | Wu et al. | |
| 8,046,362 B2 | 10/2011 | Bayliss | |
| 8,140,381 B1 | 3/2012 | Wu et al. | |
| 8,176,083 B2 | 5/2012 | Vossen et al. | |
| 8,204,809 B1 * | 6/2012 | Wise | G06Q 40/00 705/35 |
| 8,612,582 B2 | 12/2013 | Dare et al. | |
| 8,793,753 B2 | 7/2014 | Bhogal et al. | |
| 2001/0013030 A1 | 8/2001 | Colby et al. | |
| 2002/0065752 A1 * | 5/2002 | Lewis | G06Q 30/04 705/35 |
| 2002/0065879 A1 | 5/2002 | Ambrose et al. | |
| 2002/0091539 A1 | 7/2002 | Yin et al. | |
| 2002/0128938 A1 | 9/2002 | Schofield et al. | |
| 2002/0147726 A1 | 10/2002 | Yehia et al. | |
| 2002/0147815 A1 | 10/2002 | Tormasov et al. | |
| 2003/0036683 A1 | 2/2003 | Kehr et al. | |
| 2004/0006506 A1 * | 1/2004 | Hoang | G06Q 10/10 705/14.65 |
| 2004/0034699 A1 * | 2/2004 | Gotz | H04L 41/00 709/223 |
| 2004/0107125 A1 | 6/2004 | Guheen et al. | |
| 2004/0172374 A1 | 9/2004 | Forman | |
| 2005/0096950 A1 | 5/2005 | Caplan et al. | |
| 2005/0096963 A1 | 5/2005 | Myr et al. | |
| 2005/0108043 A1 | 5/2005 | Davidson | |
| 2005/0279824 A1 * | 12/2005 | Anderson | G06Q 30/02 235/380 |
| 2006/0059054 A1 | 3/2006 | Adiseshan | |
| 2007/0067297 A1 | 3/2007 | Kublickis | |
| 2007/0091874 A1 | 4/2007 | Rockel et al. | |
| 2007/0243887 A1 | 10/2007 | Bandhole et al. | |
| 2008/0071561 A1 * | 3/2008 | Holcombe | G06Q 30/00 705/59 |
| 2008/0133324 A1 | 6/2008 | Jackson et al. | |
| 2008/0154625 A1 | 6/2008 | Serbanescu | |
| 2008/0270256 A1 * | 10/2008 | Caballero | G06Q 30/0601 705/26.81 |
| 2008/0288889 A1 | 11/2008 | Hunt et al. | |
| 2009/0163183 A1 | 6/2009 | O'Donoghue | |
| 2009/0234710 A1 * | 9/2009 | Belgaied Hassine | G06Q 30/02 705/7.29 |
| 2009/0240586 A1 | 9/2009 | Ramer et al. | |
| 2010/0088155 A1 | 4/2010 | Pyle et al. | |
| 2010/0121830 A1 | 5/2010 | Berry et al. | |
| 2010/0218104 A1 | 8/2010 | Lewis | |
| 2010/0318451 A1 | 12/2010 | Niccolini et al. | |
| 2011/0246254 A1 | 10/2011 | Johnson et al. | |
| 2011/0295722 A1 | 12/2011 | Reisman | |
| 2012/0032945 A1 | 2/2012 | Dare et al. | |
| 2013/0211986 A1 * | 8/2013 | DeBie | G06Q 40/00 705/35 |
| 2013/0339088 A1 | 12/2013 | Olsen et al. | |
| 2013/0339089 A1 | 12/2013 | Olsen et al. | |
| 2014/0114709 A1 | 4/2014 | Olsen et al. | |
| 2014/0114819 A1 | 4/2014 | Olsen et al. | |
| 2014/0122176 A1 | 5/2014 | Olsen et al. | |
| 2014/0122240 A1 | 5/2014 | Olsen et al. | |
| 2014/0156343 A1 | 6/2014 | Olsen et al. | |

OTHER PUBLICATIONS

U.S. App. No. 13/841,681, filed Mar. 15, 2013, US 2014-0114709.
U.S. App. No. 13/842,398, filed Mar. 15, 2013, US 2014-0114819.
U.S. App. No. 13/844,002, filed Mar. 15, 2013, US 2014-0122240.
U.S. App. No. 13/844,306, filed Mar. 15, 2013, US 2014-0122176.
U.S. App. No. 13/895,276, filed May 15, 2013, US 2014-0156343.
U.S. App. No. 13/895,294, filed May 15, 2013, US 2013-0339088.
U.S. App. No. 13/895,302, filed May 15, 2013, US 2013-0339089.
PCT/US2014/066230, Nov. 18, 2013, WO 2015/074079.

* cited by examiner

PROVENANCE TRACKING AND QUALITY ANALYSIS FOR REVENUE ASSET MANAGEMENT DATA

CROSS-REFERENCE TO RELATED APPLICATION

The current application claims priority under 35 U.S.C. § 119(e) to U.S. Provisional patent application Ser. No. 61/661,299, filed on Jun. 18, 2012 and entitled "Recurring Revenue Asset Management System and Method." This application is also related to and co-owned U.S. patent application Ser. No. 13/841,681 filed Mar. 15, 2013 by Olsen, et al and entitled "Asset Data Model for Recurring Revenue Asset Management" now issued as U.S. Pat. No. 9,646,066, Ser. No. 13/844,306 filed Mar. 15, 2013 by Olsen et al and entitled "Predictive Model of recuning Revenue Opportunities," 13/895,276 filed May 15, 2013 by Olsen et al and entitled "Multi-Tier Channel Partner Management for Recurring Revenue Sales," Ser. No. 13/895,294 filed May 15, 2013 by Olsen et al and entitled "Recurring Revenue Management Benchmarking," Ser. No. 13/844,002 filed Mar. 15, 2013 by Olsen et al and entitled "Recurring Revenue Asset Sales Opportunigg Generation," Ser. No. 13/895,302 filed May 15, 2013 by Olsen et al and entitled "Visual Representations of Recurring Revenue Management System Data and Predictions" now issued as U.S. Pat. No. 9,652,776, and Ser. No. 13/842,398 filed Mar. 15, 2013 by Olsen et al and entitled "Inbound and Outbound Data Handling for Recurring Revenue Asset Management" now issued as U.S. Pat. No. 10,078,677. The disclosure of each document identified in this paragraph is incorporated by reference herein in its entirety.

TECHNICAL FIELD

The subject matter described herein relates to data processing and management, and more particularly to processing and managing recurring revenue asset information.

BACKGROUND

Innovations in products or marketing, the introduction of new or improved products, sales to new customers or additional sales to existing customers, and other approaches to expanding the amount of market share controlled by a company or other commercial entity have historically been primary drivers for revenue growth. However, as markets mature and consolidate, a larger fraction of revenue realized by a commercial entity (used herein to refer broadly to a company, corporation, organization, person, group of persons, or the like that undertakes commercial activity, including but not limited to sales of products and/or services to customers) may be derived from renewals of recurring revenue assets. As used herein, a recurring revenue asset can generally refer to one or more of maintenance and/or support agreements for software or hardware, service covered products, service contracts, subscription agreements, warranties, renewables, or the like.

Many commercial entities fail to maximize realization of revenue from recurring revenue assets at least in part because management of such assets is not well supported by currently available approaches. Currently available tools for managing recurring revenue are spread across customer relationship management (CRM) systems, partner relationship management (PRM) systems, data warehouses, entitlement systems, billing systems, and even spreadsheets or the like. However, recurring revenue management presents a number of challenges that differ in substantial and important ways from the typical focus of the sales staff of a commercial entity.

A typical sales process involves closing a sale or deal and moving on to a next customer. In contrast, a recurring revenue relationship is by definition repetitive, and is not efficiently tracked or managed by tools designed to support initial sales. In addition, the commercial entity's existing investments in sales personnel, sales processes, and information systems are typically directed to, and are optimized and supported with appropriate technology for, achieving maximum revenue performance in the product or services sales business, not the management of recurring revenue streams and the sales activities necessary to ensure that recurring revenue assets are maintained and even increased in value. Optimizing the recurring revenue such as service contracts and other service assets requires resolving challenges that span multiple areas of a company's operations. In today's ever-changing market landscape, service revenues have become integrally related to the success of a commercial entity. The problem, however, is that as commercial entities begin to recognize the need for this updated focus, they run into a host of challenges for which they are not prepared.

For example, a company often has to deal with fragmented data from disparate sources, and this data can be inaccurate, incomplete and sometimes duplicated, particularly in a sales channel or when selling through the channel. Further, in the case of a merger or acquisition, various legacy systems lead to complexity. Another challenge is a lack of specialization toward service contracts or service renewals. Most company data is centered on the products it sells, rather than the services contracted post sale of those products. A lack of industry focus on recurring service revenue has lead to a dearth of standard metrics and proven best practices.

Previously available approaches to recurring revenue management have not included a unified repository, or even any other way of collecting and organizing these types of information that are important to optimizing recurring revenue sales, that integrates data from multiple, disparate external client systems in support of an asset data model capable of resolving the key questions of what (e.g. services, serviceable products, etc.) has been purchased, who (e.g. which commercial entity) made the purchase or purchases, who is the end user of the purchased services or serviceable products, where are the purchased services or serviceable products being used, how are the purchased services or serviceable products being used, how satisfied is the end user (and optionally other at the commercial entity) with the purchased services or serviceable products, where are other opportunities for sales of additional related or unrelated services to the commercial entity as a result of the sale of the purchased services or serviceable products, and the like. Furthermore, software systems to automate and optimize the recurring revenue market have generally been limited in regards to analytics specific and relevant to recurring revenue assets, well-developed key performance indicators (KPIs) for management of such assets, the ability to acquire and aggregate the data streams, and other useful features that support optimization of recurring revenue sales and renewals.

SUMMARY

Consistent with one or more aspects of the current subject matter, a recurring revenue repository can receive and store recurring revenue information from one or more external data sources. The receiving and storing of the data can be performed in a manner that allows rapid use of data accumulated from disparate data streams and in-line "cleaning" of these data while they are also accessible to end users. Some aspects of the current subject matter can include generation of a recurring revenue asset data model from at least a portion of this recurring revenue information. The recurring revenue asset data model can represent relationships among recurring revenue assets and organizations, people and products associated with the recurring revenue assets, and the like. A number of analytics and business intelligence processes can optionally be executed on the recurring revenue asset data model and on the recurring revenue information in the recurring revenue repository.

In general, a recurring revenue management system can perform one or more operations, which can include one or more of receiving data from one or more external client systems via one or more data feeds; translating these one or more data feeds into internal data objects that support the functionality of the recurring revenue management system; resolving the data records in the one or more feeds against data records that have already been incorporated into the internal data objects; tracking the provenance of the received and incorporated data records as well as changes to instances of the internal data objects that are made as a result of data records received in the one or more feeds; and supporting client-specific rules for processing of incoming data and handling of data record duplicates, data incongruities, and other data inconsistencies that can result from execution of an inline master data management approach.

In some aspects of the current subject matter, a method includes receiving a first unit of data at a recurring revenue management system, and receiving a second unit of data at the recurring revenue management system. The method further includes extracting content from the first unit of data and the second unit of data based on one or more parameters of a predefined data object that is part of an asset data model defined in the recurring revenue management system. The method further includes adding the extracted content to an instance of the predefined data object and associating a reference tag with the content extracted from each of the first unit of data and the second unit of data, each reference tag comprising identification information for its associated content. The method further includes detecting a duplicate data condition in which the content extracted from the first unit of data and the content extracted from the second unit of data provide redundant, conflicting values for a same field within the instance of the data object. The duplicate data condition is resolved by applying a predefined approach to conflict resolution that is based on the identification information in the reference tags of the content of the first unit of data and the second unit of data.

In optional variations, one or more additional features can be included in any feasible combination. The predefined approach can include identifying one or more key fields in the content, each of the one or more key fields having a uniqueness property. The predefined approach can include a clustering algorithm to measure one or more statistical anomalies relative to a larger group of object in the asset data model. The asset data model can include one or more of each of product data objects, recurring revenue asset data objects, opportunity data objects, and contact data objects. The content extracted from the first unit of data and the second unit of data can represent one or more of each of product data, recurring revenue asset data, opportunity data, and contact data. An asset data object of a recurring revenue asset can be generated according to the resolving of the duplicate data condition.

Implementations of the current subject matter can include, but are not limited to, systems and methods including one or more features as described herein as well as articles that comprise a tangibly embodied machine-readable medium operable to cause one or more machines (e.g., computers, etc.) to result in operations consistent with these features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes recurring revenue management systems and methods, techniques, etc. relating to operations and functionality in support of recurring revenue management. Consistent with implementations of the current subject matter, a recurring revenue management system can include a recurring revenue repository that stores data relating to recurring revenue assets, which are discussed in greater detail below. A unified data store model can be provided to manage both transactional and analytical uses of data. In some implementations of the current subject matter, the use of dynamically generated and updated in-memory data structures (including but not limited to data cubes and the like) can facilitate rich analytical exploration of data in near real-time, thereby allowing adaptation to customer specific dimensions and metrics. In some implementations of the current subject matter, an analytics framework supports role-specific dashboards, and a plug-in model with rich representational state transfer (REST) application programming interfaces (APIs) can be included support use of third-party ad hoc analytics products.

Figure 1:
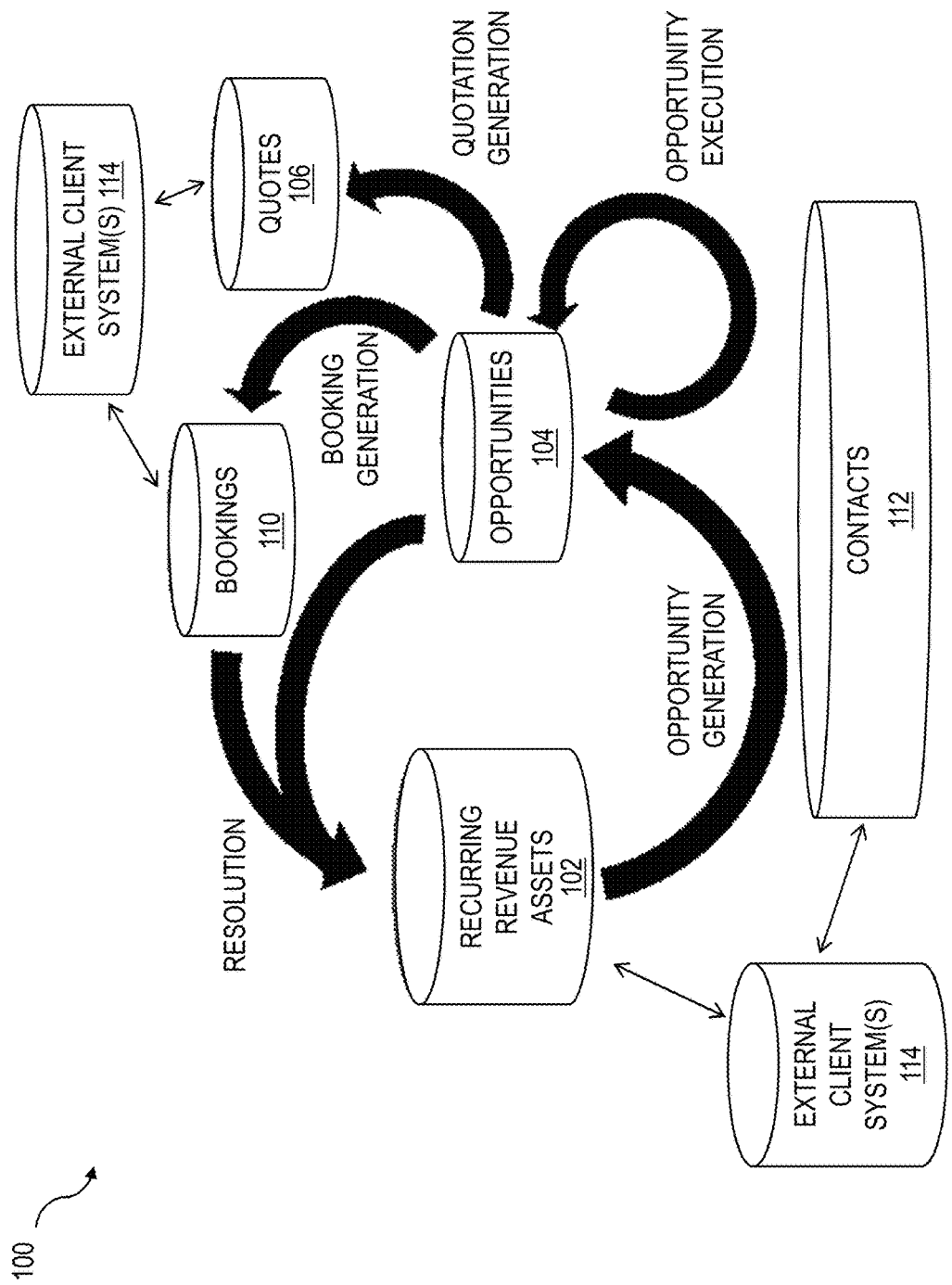
FIG. 1 shows a diagram illustrating data flows in a recurring revenue management framework consistent with implementations of the current subject matter.

FIG. 1 shows a diagram 100 showing data flows occurring in a recurring revenue management system consistent with implementations of the current subject matter. As shown in FIG. 1, multiple data sources can contribute data that are included within an asset data model, which can include recurring revenue assets information in a recurring revenue assets repository 102, opportunity and/or offer information in an opportunities repository 104, quotation information in a quotations repository 106, bookings information in a bookings repository 110, contacts information in a contacts repository 112, and the like. It should be noted that while various repositories in FIG. 1 are depicted as physically separate from one another, any data storage configuration and arrangement of one or more repositories is within the scope of the current subject matter. For example, all or some of the repositories 102, 104, 106, 110, 112 in FIG. 1 can be included within a single repository structure, which can be hosted at a single storage facility or alternatively in distributed storage (e.g. in the "cloud").

Referring again to FIG. 1, the recurring revenue assets repository 102 can include information about instances of covered assets (e.g. products such as physical items or software licenses, etc. that can be sold by a commercial entity to one or more customers of the commercial entity) that have been sold. These covered assets form the basis for recurring revenue assets because they constitute an existing instance of a seller-purchaser relationship between the commercial entity and the customer who purchased the covered assets. The recurring revenue assets (service assets) themselves can include, among other assets, service contracts, warranties, maintenance agreements, and the like sold by the commercial entity to the customer in association with, or to provide an ongoing service arrangement for, the covered assets.

Because it relates to an existing and ongoing relationship with the customer, the information about products and their associated recurring revenue assets that is contained in the recurring revenue assets repository 102 can be used to generate one or more opportunities for renewal of an existing recurring revenue asset (to thereby maintain the recurring revenue stream) and in some cases to increase the value of the recurring revenue asset (for example by selling a higher value agreement, service contract, etc. to the customer). As used herein, opportunities are groupings of offers targeted for execution of a sale to a customer, and offers are individual instances of a recurring revenue asset available for renewal. The groupings of offers in an opportunity can include multiple offer instances for the same customer. In some examples, the offers grouped into an opportunity can all have expiration dates during a sale period (e.g. a month, a quarter, a year, etc.). Opportunities can be collected in the opportunity repository 104.

Once acted upon by sales staff who make contact with appropriate decision makers at the customer, opportunities can be moved into a quotation stage during which quotations related to renewals, increases, etc. of existing recurring revenue assets can be generated. Quotations, which include a transaction offer for a set of offers included in an opportunity, can be stored in the quotation repository 106. As a quotation is transitioned to a deal being closed, a booking, which refers to a set of offers accepted by a customer, can be generated and stored in a bookings repository 110. Resolution of a booking results in generation of a new recurring revenue asset, which can be retained in the recurring revenue asset repository 102 for use in generating future offers and opportunities. For example, when a resolved service contract or the like approaches its next expiration, a new offer for renewal of that service contract can be generated and optionally grouped with other offers for the same customer with similarly timed expiration dates into a new opportunity. Additional data that impact the generation of opportunities and execution of those opportunities is contact information for the decision makers and other important contacts (e.g. individuals and companies involved in the sales process) with whom sales staff need to communicate. This contact information can be stored in the contacts repository 112.

Efficient and structured assembly of the information contained in the repositories 102, 104, 106, 110, 112 depicted in FIG. 1 can be an important aspect of a recurring revenue management approach consistent with implementations of the current subject matter. However, much of this information is typically contained (or at least originates) in other data management systems (referred to herein as external client systems 114) than the recurring revenue management system, as discussed in greater detail below in reference to FIG. 2. The term "client" is used herein to refer to a commercial entity that employs features or functions of a recurring revenue management system provided or supported by a recurring revenue management vendor or service provider. Effectively, as used herein, the client is a commercial entity that is a customer of the recurring revenue management vendor or service provider. The client commercial entity in turn has customers to whom the client has sold and/or wishes to sell or renew recurring revenue assets such as those described elsewhere herein. A customer of a client commercial entity typically has an installed base of products, for which the customer can purchase various service agreements, contracts, etc. In effect, the products in the installed base of products can be considered as covered assets for which the commercial entity can sell to the customer one or more service contracts, agreements, etc. From the perspective of the client commercial entity, these service contracts, agreements, etc. can be considered to be service assets or recurring revenue assets.

A recurring revenue management approach consistent with implementations of the current subject matter can be configurable for the storage, retrieval, searching, and analysis of a wide range of recurring revenue information. Data relating to service assets or other recurring revenue assets, referred to herein as "recurring revenue data," can include information pertaining to what a commercial entity has sold, such as for example services, products for which related services can be sold, etc. (e.g. the covered assets). Recurring revenue data can also include information about the purchasers, users, locations of use, modes of use, etc. of such services, serviceable products, etc. In other words, the recurring revenue data can include information about what recurring revenue assets an entity has, who the customers and users of the recurring revenue assets are, and where and how the recurring revenue assets are being used. Recurring revenue data can further include metrics relating to satisfaction of the customer or user of the recurring revenue asset, as well as information relating to potential opportunities for services contract sales (e.g. for serviceable products soon to come off warranty, etc.), and the like.

The recurring revenue management system can import diverse information, and of various formats, from external client systems 114 into a common asset data model. The asset data model can facilitate a wide range of recurring revenue management capabilities, and can provide automated assistance for entity resolution (resolving external entities to pre-existing entities in the system). The recurring revenue management system maintains provenance information for all information loaded into the system (e.g. all recurring revenue data from each of the one or more data sources) to be able to discern information origin.

Figure 2:
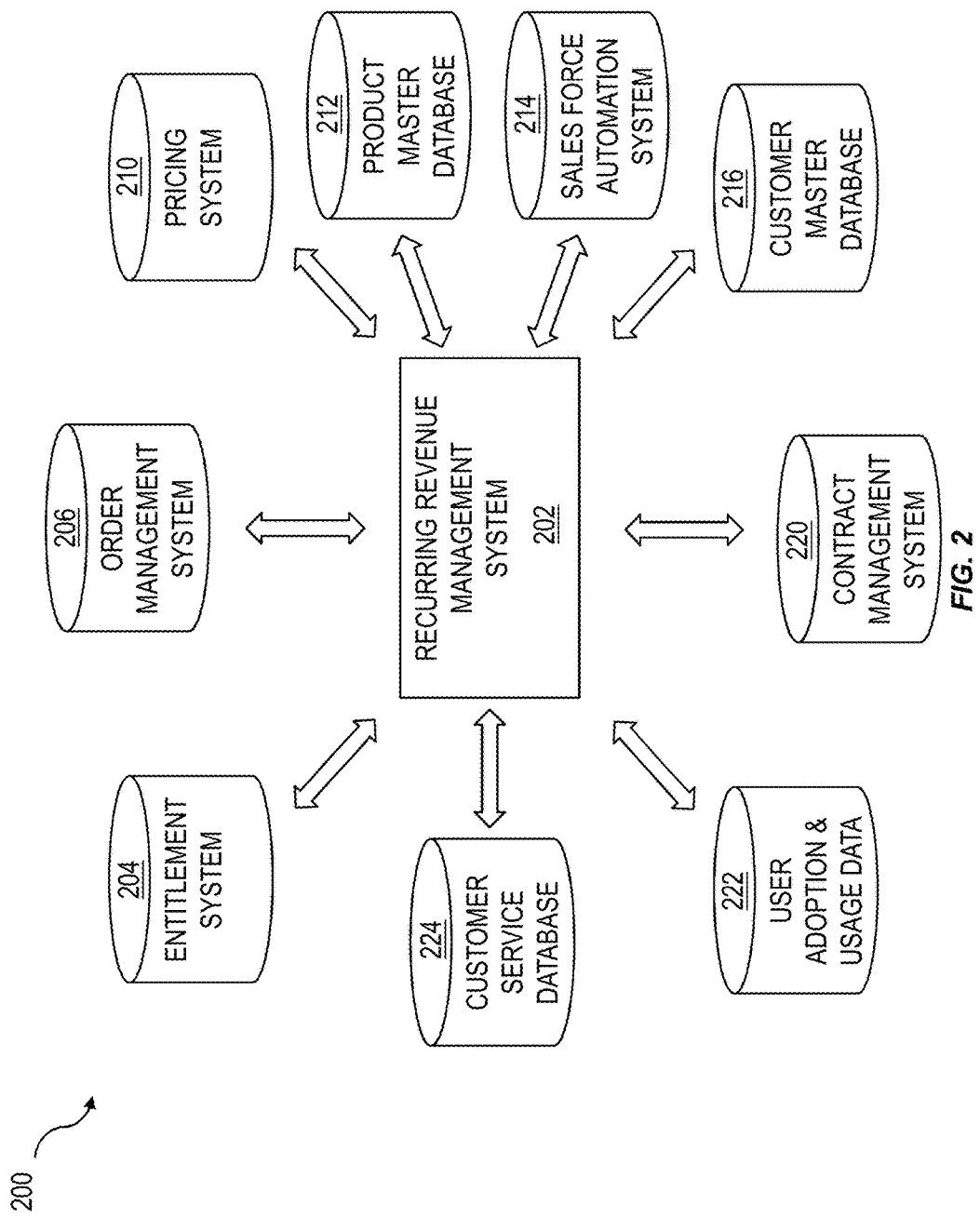
FIG. 2 shows a diagram showing data exchanges between a recurring revenue management system consistent with implementations of the current subject matter and examples of external client systems.

As noted above in reference to FIG. 1, a recurring revenue management system consistent with implementations of the current subject matter can receive and assign a usable structure to information obtained from a variety of external clients systems 114. FIG. 2 shows a diagram 200 illustrating potential sources of data or other information that can be acquired by or received at a recurring revenue management system 202. Among other possible data sources, the external client systems 114 referenced in FIG. 1 can include one or more of an entitlement system 204, an order management system 206, a pricing system 210, a product master database 212, a sales force automation system 214, a customer master database 216, and a contract management system 220. It will be understood that the individual external client systems shown in FIG. 2 can in some implementations of the current subject matter be provided by one or more systems that support features of more than one such external system. For example, external client systems can include customer relationship management (CRM) systems, enterprise resource planning (ERP) systems, business intelligence (BI) systems, calendar and contact systems or databases, customer service systems, inventory systems, accounts receivable systems, sources of customer usage and engagement information, and the like. In general, a commercial entity acquires these various systems, databases, and the like from a more than one different software or computing system provider, each of which typically uses distinct database structures, data formats, report configurations, application programming interfaces (APIs), and the like that are optimized for the specific tasks to be performed by its product. Assembly of information from a group of data sources with multiple, potentially disparate database structures and data formats can present a challenge for any system that seeks to collect such information, present it in a usable format, support detailed analytics based on the data, etc. Further challenges can be presented by the need to authenticate potentially conflicting information received from more than one source. Additionally, information collected in a recurring revenue management system consistent with implementations of the current subject matter is typically not static. Rather, users interacting with the system are likely to update or correct the information based on communications with contacts, etc. Execution of tasks depicted in FIG. 1 can also alter the "correct" version of some of the information received into the recurring revenue management system.

An approach to this problem typically involves receipt of the data at the recipient system from a source system, creation of customized mappings (or application of pre-created mappings) between data structures of each source system and the data structures of the recipient system, and transformation of the data from the source system data structures to the recipient system data structures according to the mappings. Subsequent to import of data from the data sources but prior to making the imported data available for productive use by end users at the recipient system, one or more quality control operations generally occur to ensure consistency of the imported data; to identify duplicate and potentially conflicting records; and to alert one or more users with appropriate permissions levels to the presence of any errors, partial imports, missing data, or the like. For export of data from the recipient system back to the source system, a similar process can be undertaken, with the mapping being performed in reverse.

For an active recurring revenue management system, particularly one supporting recurring revenue asset management for a large commercial entity with a sizable sales staff, a large number of recurring revenue assets, and a complicated information landscape in which multiple systems maintain data records relevant to support of recurring revenue management activities, a quality control process that interrupts productive use of the system subsequent to a data import is not desirable. For example, in a large enterprise with multiple data streams, quality control could be quite time consuming. Additionally, in the interest of having the most current information available for use by the recurring revenue management system, frequent data imports can be advantageous. However, if each such import were to require substantial downtime for the import and transformation processes to complete and quality assurance routines to execute, usability of features supported by the recurring revenue management system would be negatively impacted.

A recurring revenue management approach consistent with implementations of the current subject matter can include synchronization and integration of data with a variety of disparate external client systems. For example, a recurring revenue management system can access data records and formatted data from systems such as entitlement systems, order management systems, customer master systems, product master systems, and service delivery systems. The data from these external client systems is usually not static. Accordingly, it is important that a recurring revenue management system be able to receive data feeds from such systems at a high throughput rate. Furthermore the received data is advantageously usable either upon receipt at the recurring revenue management system or at least within a very short processing time.

Figure 3:
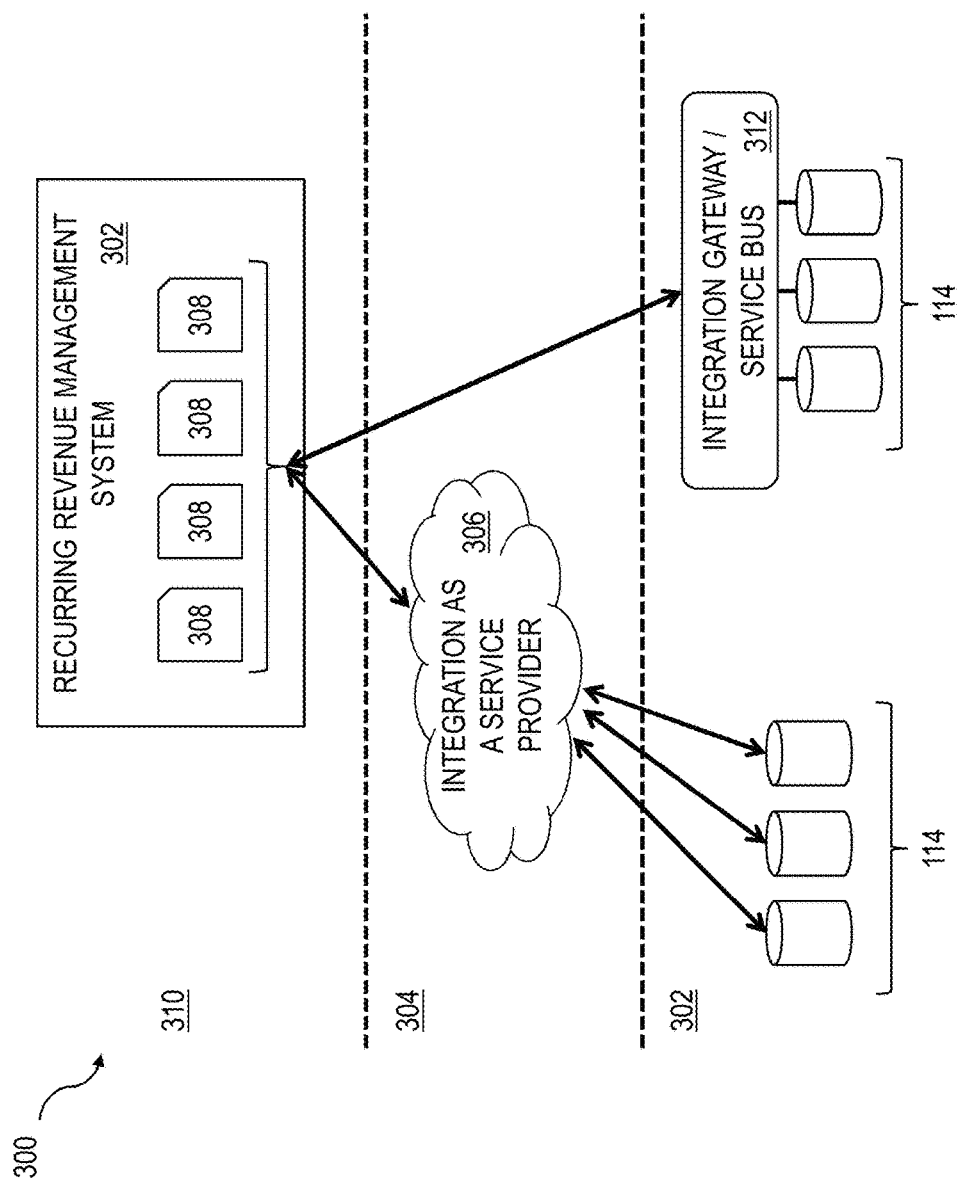
FIG. 3 shows a diagram illustrating features of a data synchronization inbound pipeline consistent with implementations of the current subject matter.

FIG. 3 shows a diagram 300 illustrating features of a data ingestion pipeline. A source data layer 302 can include external client systems 114, which can include various data sources such as those discussed above. In some cases, an intermediate, extraction, transformation, and mapping layer 304 can be included. At this intermediate layer 304, an integration as a service (IaaS) provider 306, which can be provided as part of the recurring revenue management system 202 or from a third party vendor, can perform various functions necessary to map data records from the data sources at the external client systems 114 to target data objects 308 at the recurring revenue management system 202, which exists in a top layer 310 of the pipeline at which the incoming data are improved in resolution, scored, enhanced, etc. The IaaS provider 306 can allow a recurring revenue management system to efficiently broker interactions with external client systems 114. Examples of functions that can be performed by a IaaS provider 306 can include but are not limited to file loading from external client systems into the recurring revenue management system 202, direct connections into client databases, integration with sales force automation systems, etc.

Alternatively or in addition to the use of an IaaS provider 306 or other middleware for transforming data from a first data structure at the data sources to a second data structure at the recurring revenue management system 202, one or more external client systems can be served by an integration gateway or service bus 312 at the data source layer 302. The integration gateway or service bus 312 can perform similar functions to the IaaS provider 306, for example for on-premise applications, databases, or file shares of the commercial entity that are better served by a locally installed integration platform than a cloud-based approach such as an IaaS provider 306. A data ingestion pipeline consistent with implementations of the current subject matter can advantageously integrate a large number of inbound record types into a more limited, focused set of data object types that directly support recurring revenue management operations.

Typically, the data supplied to the data ingestion pipeline is not structured in the same way as it will ultimately be represented in the system. One specific structural mismatch issue is that incoming data can be highly fragmented. For example, a single asset data object in the system may need to be constructed through the loading and merging of multiple source objects that are not guaranteed to enter the ingestion pipeline in any particular order or within any specified time frame. To address this challenge, the system constructs skeletal objects that hold a partial state of the final object and that include annotations that the system uses for future resolution. As additional fragments arrive, the data ingestion pipeline uses matching algorithms to coalesce new skeletal objects with existing skeletal objects into a whole object like an asset object, a product object, or the like. One example of a matching approach is to match "external identifier" strings that are added as annotations to the skeletal objects at load time to other annotations on previously loaded objects that also retain similar external identifier strings. Support for external identifier strings can be included as part of the structure of data objects that make up an asset data model consistent with implementations of the current subject matter.

Figure 4:
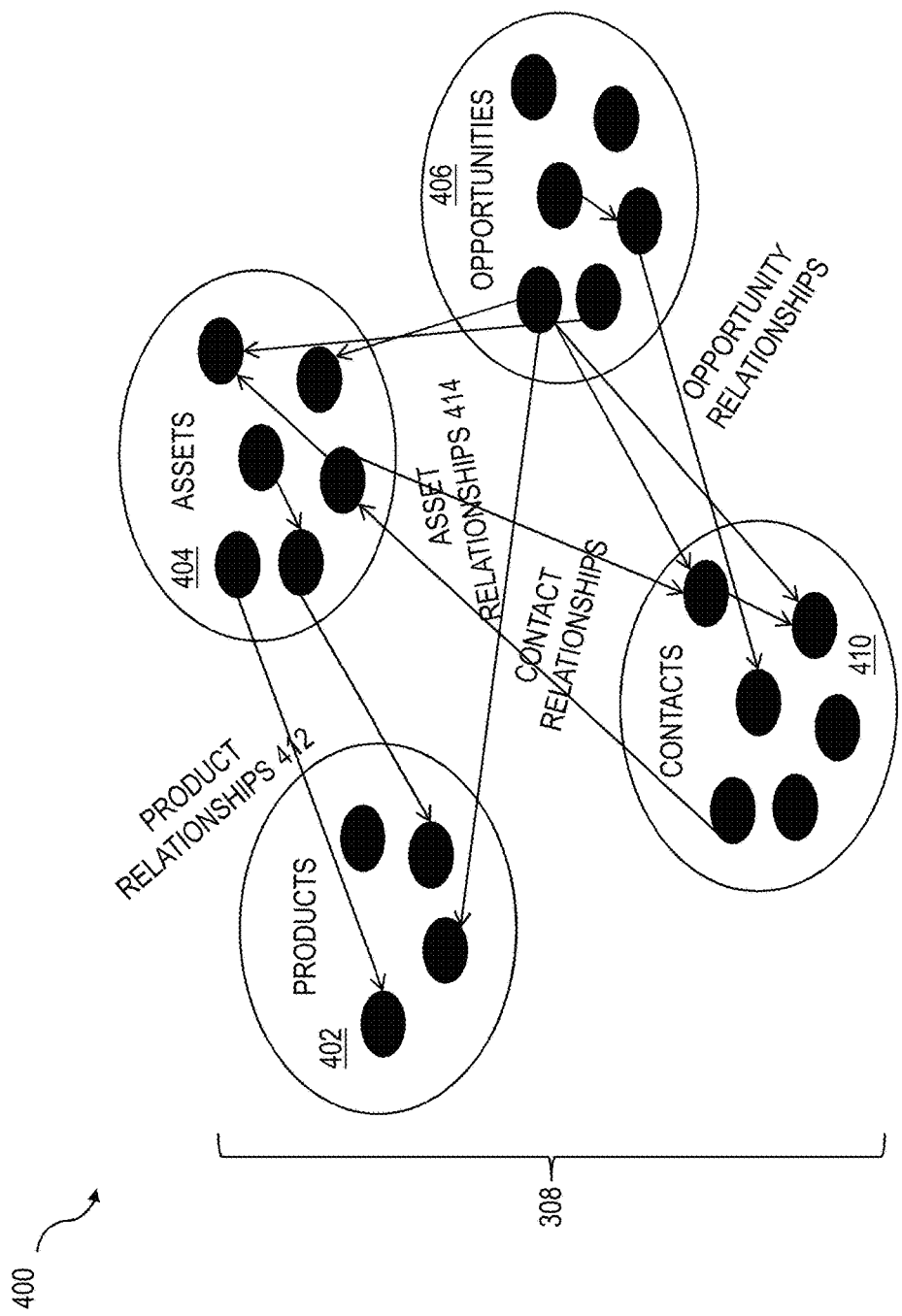
FIG. 4 shows a diagram illustrating features of an asset data model consistent with implementations of the current subject matter.

FIG. 4 illustrates features of a asset data model 400 that can include interrelated data objects 308 capable of supporting the recurring revenue management features and functions described elsewhere herein. The recurring revenue management system 202 can support an asset data model 400 as a flexible mechanism for representing complex relationships among assets, organizations, people, and products, and on which a number of analytics and business intelligence processes can be executed. The recurring revenue management system can provide one or more application programming interfaces (APIs) or other standardized interface to access service renewal assets in the recurring revenue repository, and the recurring revenue repository information model used by the repository provides a uniform means of analyzing, searching, and manipulating recurring revenue data.

Consistent with implementations of the current subject matter, a recurring revenue management system 202 and an included asset data model 400 can include product data objects 402, recurring revenue asset data objects 404, opportunity data objects 406, and contact data objects 410. Product data objects 402 represent products (e.g. covered assets), which as noted above in reference to FIG. 1, can include items sold to customers and can be considered as part of the customer's installed base of covered assets. A framework of data objects 308 can include a set of common relationships related to recurring revenue management, these relationships can include product relationships 412, asset relationships 414, opportunity relationships 416, and contact relationships 420. Products can provide the basis for a recurring revenue assets represented by instances of asset data objects 404 via one or more product relationships 412 between a product represented by a product data object 402 and the instances of an asset data object 404 representing the recurring revenue asset or assets. Product relationships 412 can also optionally exist between products represented by a product data object 402 and one or more of recurring revenue assets represented by instances of asset data objects 404, opportunities represented by instances of opportunity data objects 406, contacts represented by instances of contact objects 410, other products represented by other instances of a product data object 402, etc.

Further with reference to FIG. 4, asset relationships 414 can exist between a recurring revenue asset represented by an instance of an asset data object 404 and one or more of a product represented by an instance of a product data object 402, a contact represented by an instance of a contact data object 410 (e.g. a person, organization, etc. relevant to a recurring revenue asset), an opportunity represented by an instance of an opportunity data object 406 (e.g. a bundle of offers relating to renewal of existing recurring revenue streams and/or to establishment of new or increased value recurring revenue streams), another recurring revenue asset represented by another instance of an asset data object 404, etc.

Opportunity relationships can exist between an opportunity represented by an instance of an opportunity data object 406 and one or more of a specific recurring revenue asset represented by an instance of an asset data objects 404, a product represented by an instance of a product data object 402 underlying the recurring revenue asset(s), a contact represented by another instance of a contact data objects 410, another opportunity represented an instance of an opportunity data object 406, etc. Contact relationships can exist between a contact represented by an instance of a contact data object 410 and one or more of a recurring revenue asset represented by an instance of an asset data object 404 (for example based on communications relating to an initial sale of a recurring revenue asset 404 and/or to one or more renewals of the recurring revenue asset 404), a product represented by an instance of a product data object 402 underlying the recurring revenue asset(s), an opportunity represented by an instance of an opportunity data object 406, another contact represented by another instance of a contact data object 410, etc.

The data objects 308 discussed above can optionally also be extendible, for example through customer-specific extensions fields. Additional custom objects can be added to a customer's configuration. In addition, the set of base relationships can be extended to match specific requirements of the commercial entity using the recurring revenue management system 202. Relationships between instance of the product data object 402, the asset data object 404, the opportunity data object, and the contact data object can be established based on one or more of the data received from the incoming data streams, existing data in the recurring revenue management system 202, user input, and the like. The instances of the data objects 308 and the defined relationships between these instances together make up the asset data model 400.

An asset data model 400 such as that described herein can provide a useful vehicle for exploring and understanding relationships that exist among product objects, asset objects, organization objects, contact objects, and opportunity objects. Many of these relationships are directly derived from information that exists in source client systems, while others require inference on the part of the system, others are generated by the system as part of object generation, others are created as a side effect of system actions, and still others are constructed as a result of actions by system users. In an illustrative but not limiting example of an inference approach to generation of the relationships between objects, a relationship inference includes exploitation of transitivity (e.g. if a relates to b, and b relates to c, a relationship can be instantiated between a to c), and an automated instantiation of inverse relationships (if a relates to b, then there exists an inverse relationship from b to a).

A consistent approach to managing opportunities, quotes, and bookings activities can be provided through one or more features supported by an asset data model 400 consistent with implementations of the current subject matter. Such features can include, but are not limited to, detailed reports, pipeline dashboards, opportunity details, territory management, and the like. Detailed reports allow sales representatives to proactively identify and address at-risk opportunities, while pipeline dashboards allow managers to view pacing of sales activities by time period and production metrics. Opportunity details can allow viewing of deal progress and logged activities by sales representative, sales operations assistants, managers, and other staff. Territory management allows managers to drive sales representatives' behavior by □assigning tasks to opportunities based on existing priorities. Territory can refer to divisions of available opportunities based on one or more factors, which can include but are not limited to geography, customer groupings, subject matter, etc.

Through the asset data model 400, a clearer picture can be presented to users (e.g. sales staff, sales support staff, managers, executives, etc. of the installed base of products, services, etc. that have been previously sold to customers of the commercial entity and that provide the foundation for new and renewal sales of recurring revenue assets. Management of this installed base using an asset data model 400 can improve accuracy and insight into the customer base and enable leveraging of this installed base data to maximize recurring revenue streams. Increased sales can be achieved through improved quote accuracy, consolidation, identification of cross-sell and up-sell opportunities, better handling of renewal contacts and processes, and the like. Service delivery efficiency and customer satisfaction can be increased through improved entitlement, shipping, and staffing resource planning. Prediction of customer behavior can also improve, which can facilitate optimization of sales staff activities.

Among other information that can be received in the inbound data streams and incorporated into appropriate instances of data objects 308 in the asset data model 400, the asset data model can store and organize expiration information for existing recurring revenue assets, product information (e.g. characterizations of the install base including who, what, where, etc. information), relationships (e.g. predecessors, successors, associated opportunities, covered products, customers, partners, locations, etc.), expected value analyses (e.g. projected future revenue, product margin analyses, etc.), and the like. These data are advantageously incorporated into the asset data model 400 via the one or more inbound data streams.

A recurring revenue management system including one or more features as described herein can provide a scenario-based revenue projection from the recurring revenue repository of service asset data and other recurring revenue data. In some implementations, the recurring revenue management system generates a user interface to display a projection of revenue over time from a set of assets based on expiration dates, product information, projected sales timing, and projected sales effectiveness.

A recurring revenue management system 202 consistent with implementations of the current subject matter can employ an asset data model specialized for recurring revenue asset sales and renewals. The asset data model can include fields related to service timing events, service outcomes, relationships to other assets and other context specific fields. For example, in support of both new sales and renewal sales of recurring revenue assets (e.g. a new service contract, a new subscription, etc.), a recurring revenue management system can process information received from the external client sources and optionally also updated information generated by sales staff (e.g. sales representatives, sales support staff, etc.) and other employees (or other persons) working on behalf of the commercial entity) through the execution of sales contacts, ongoing sales and renewal operations, and other functions supported by the recurring revenue management system to populate data values in one or more fields relating to one or more of a local opportunity amount, a local transaction amount, an earliest existing end date, an earliest new start date, a latest new end date, a commit level (Red, Yellow, Black, Green, or other representational scheme), a renewal sales stage, a covered product, a service product, a service product description, a client batch quarter, a win/loss result explanation, an existing contract number, an existing purchase order number, an existing distributor, an existing reseller, a new distributor, a new reseller, and the like.

In support of renewal sales of recurring revenue assets (e.g. a renewal of an existing contract, a value-added upsell of an existing contract, etc.), a recurring revenue management system can process information received from the external client sources and optionally also updated information generated through sales contacts, ongoing sales and renewal operations, and other functions supported by the recurring revenue management system to populate data values in one or more fields relating to one or more of a not contacted/contacted status, a quote requested status, a quote delivered status, a customer commitment status, a purchase order received status, as closed sale status, etc.

The asset data model can also track reasons, explanations, etc. relating to resolution of an opportunity, group of opportunities, a single offer, etc. (e.g. a "why" regarding a win or loss outcome for a given opportunity or offer). Outcomes can include a closed (successful) sale, a "house" account (e.g. an invalid opportunity, perhaps relating to an underlying product or service that a customer once had but has since disposed or), or a "no service" outcome in which the customer simply chooses not to purchase a service agreement or subscription or allows an existing agreement to expire without renewing. One or more reason codes can be included and tracked as part of the asset data model for each type of outcome. These codes can be useful in providing feedback to service salespersons, and as additional input data for further analytics and business intelligence processes. For a closed sale, an outcome code can include, without limitation, a backdated sale, a long co-term sale, a short co-term sale, a discounted sale, a multi-year advance sale, a pricing change sale, a re-certification fee included sale, a renewed at par sale, a service downgrade sale, a service upgrade sale, an uncovered sale, or the like. For a house account outcome, an outcome code can indicate, without limitation, one or more of a bad data situation, a cancelled contract or agreement, a covered service, a duplicate service, an end of support condition, an evergreen billing situation, an international transaction, a leasing situation, an OEM customer, an "other" explanation, a product return, a sales pullback by the customer, or the like. For a no service outcome, an outcome code can indicate, without limitation, one or more of a replacement of the product by the customer, a competitive distributed value added reseller (DVAR), a competitive product replacement, another explanation for a competitive service loss, a customer cost-benefit decision, that the customer no longer exists, a customer satisfaction driven refusal to buy or renew, that the covered product or service is at the end of its service life, some other data management issue, a decommissioned or otherwise removed from service product, a third party maintenance agreement, an unresponsive end user, an unresponsive value added reseller (VAR), a no service VAR, or the like.

A recurring revenue management system consistent with implementations of the current subject matter can include a mechanism for coordinating online and offline activities of sales teams and individuals to optimally coincide with expiration or other timing events associated with a service sale. Such mechanisms can include automated workflows that guide when and how customers are contacted, when activities such as quote request and quote presentment are executed, and when escalations occur. The sales process can incorporate one or more key metrics associated with service sales, such as for example resolution rate, close rate, conversion rate, and the like that can be used to optimize performance.

A recurring revenue management system consistent with implementations of the current subject matter can also implement one or more team coordination processes for pipelines and territories that ensure optimization of team outcomes. The processes, metrics and workflows required to drive a sales outcome can be encoded in software and computer program products, to enable the recurring revenue management system to perform predictive performance management.

Automated or semi-automated forecasting of team-based service sales can also be supported by a recurring revenue management system consistent with implementations of the current subject matter. The recurring revenue management system can provide a framework for data collection from representatives based on key sales metrics, and which allows representatives to follow a periodic (i.e. weekly) computer-generated discipline process, leading to accurate monthly and quarterly sales forecasts. The forecasting processes can incorporate a dual estimation approach, where bottom-up (individual opportunity assessment-based) and top-down (expiration date grouping-based) calculations are employed.

User-configured sales automation programs can be used to drive specialized process behavior for specific sets of opportunities and service sales operations. These automation programs can include adaptive quote and bookings management for service sales. Capabilities of adaptive quote and bookings management functionality consistent with one or more implementations of the current subject matter can include quote request categorization (e.g. to identify key properties of the quote to guide processing), quote request routing (e.g. to route a request to a proper resource, either human or automated, to maximize processing efficiency), statistical prediction of quote request outcomes (e.g. to predict a probability of rejection and project a required processing time), SLA management (e.g. to effectively measure on-time performance and to guide expectations of quote requestors), throughput forecasting and management (e.g. to manage workload and properly price quote processing services), semi-automated bookings reconciliation (e.g. to allow reconciling an opportunity-based sale, such as from a CRM perspective, with an external order management system view), a dynamic (i.e. rules-based or algorithmic) performance management engine for optimizing work/activity allocation, and the like.

A recurring revenue management system can further include modules for managing a complex channel partner network. The capabilities of the channel partner network management module(s) can include one or more of a federated permission model that allows OEMs to efficiently distribute access to opportunities across a multi-level network of channel partners, incumbency logic that determines which opportunities should be visible to any given channel partner, gathering and disseminating forecast information from each channel, sales incentive programs that can be executed across the channel, self-service management by channel partners (e.g. to allow management of users and permissions for that partner), quote processing management (e.g. dynamically across a multi-level channel), and the like.

A recurring revenue management system can also support holistic analysis of customer success management (CSM), which can include one or more of service asset analysis, sales execution analysis, sales operations analysis, and the like. These features of SRM can include analytical capabilities to collect and display benchmark comparisons for all aspects of SRM.

Data quality management is also an advantageous feature that can be included in a recurring revenue management approach consistent with implementations of the current subject matter. For example, data quality scoring, user interaction management to improve data quality, data quality templates, data provenance tracking, and the like can be a part of a recurring revenue management system 202. A recurring revenue management system 202 can perform master data management across data obtained from a number of disparate and unrelated data sources. Data provided by each of the one or more sources (e.g. external client systems 114) can be received at the recurring revenue management system 202 asynchronously, continuously, discontinuously, in a series of discrete batches, etc.

Generic techniques and mechanisms for managing data quality and provenance can be included in a recurring revenue management approach. For example, each of the data object types included in the asset data model can make use of a data quality template and aggregate statistics to identify quality anomalies in individual objects. ☐ A data quality template can be used to generate a quality measurement for an individual object, based on a set of field and object level validation rules. In addition, a statistical profile can be created for a collection of objects that can be used to identify anomalies by comparison of individual objects to the distribution of similar objects in the collection. In one example, individual objects or aggregated groups of objects can be compared to one or more statistical metrics applied to a larger group of objects. The individual objects or groups of objects can be identified as outliers based on exceeding a specified absolute or relative amount of deviance from the statistical metrics for the larger group. The identified outliers can be flagged or otherwise designated as potentially suspect or unreliable data objects.

As noted above, at least some of the data included in the asset data model 400 typically arrives in the form of data streams or feeds from external client systems 114. Data quality controls and analysis can be applied as part of the load process for data received as part of these inbound data streams or feeds, thereby permitting quarantining and cleaning of data before it becomes fully operational.

Provisions can also be included for detection and resolution of duplicate data records or duplicate entries for a single data field within a data object 308. De-duplication routines or algorithms can make use of one or more identified key fields whose uniqueness properties are known a priori, or can be based on clustering algorithms that identify likely duplication based on one or more measurements of statistical anomaly relative to a larger group of objects or records.

Data provenance tracking and capture can be an advantageous feature, at least because understanding the origin of data and the source and context of changes can be very useful in many recurring revenue management scenarios. Data provenance features can also be used to manage situations where multiple perspectives on the state of an object need to be maintained, such as changes pending approval by an authoritative source. Consistent with implementations of the current subject matter, as data are periodically received at a recurring revenue management system from one or more external client systems, these incoming data are mapped to target data objects 308 in the asset data model. In addition, each data record, or alternatively groupings of one or more data values or fields within a data record if the data record includes more than one value or field, can be "tagged" or otherwise associated with a data reference tag that includes identifying information. The identifying information in the data reference tag can include an indication of the external client system or other source from which a given unit of data were received into the recurring revenue management system. A unit of data that is manually entered or updated by sales staff or other personnel of the commercial entity using the recurring revenue management system can likewise receive an associated data reference tag indicating the origin of that unit of data. The data reference tag can also include other identifying information about its associated unit of data, such as for example a date of receipt of that unit of data by the recurring revenue management system, a user identifier or role or permission level of a user who manually entered or updated the unit of data, etc. Optionally, each unit of data tagged in this manner can include a tag history that maintains a history of all data reference tags associated with the unit of data such that a history and source of origin of all changes to the unit of data can be tracked.

The asset data model 400 includes provisions for automated data quality assessment and tracking. Entities in the recurring revenue repository carry quality assessment information and provenance information, for example via a mechanism such as the reference tags described above, that facilitate problem identification, provide statistically based guidance, and allow for control of suspect updates, i.e. to control the impact on the system of inputs of data that are suspected to be of bad quality (or of unconfirmed good quality). For example, the system can take in lower quality data and flag it so that it can be quarantined from aggregate calculations. Capabilities of the asset data model can include data load tracking and summary as noted above, a direct click-through ability that allows viewing of loaded records from a summary view. Data quality and scoring can also be included.

Addition of a reference tag feature to all inbound data from the multiple, disparate data streams thereby enables tracking and quality assurance of a range of possible data quality metrics and further supports customized data cleaning rules that can be established by a specific commercial entity with regards to its data. Annotation of objects with reference tags can provide a basis for ongoing, bi-directional synchronization between the recurring revenue management system 202 and source systems with related data (e.g. external client systems 114). Synchronization rules specified in a configuration of the recurring revenue management system can use the origin information conveyed by the reference tags to make decisions as to how to modify the state of objects in both the recurring revenue management system 202 and source systems. For example, using information retained in a reference tag relating to time and date of arrival of a data record or value, a set of rules can be applied to resolve conflicts in data values, to assign prioritized preferences for presentation of data from one data source over another in the event of conflicts, preferences for re-propagation of data back to source systems (e.g. external client systems 114) based on updates or revisions occurring to the data at the recurring revenue management system (e.g. to identify data records or data values that are "approved" or otherwise acceptable for use in updating, overwriting, etc. data for one or more sources systems maintained by the commercial entity), and the like. A commercial entity using features of a recurring revenue management system can optionally use all or some of a set of default rules, a set of entity-specific customized rules, a combination of default and custom rules, or the like in determining which data is to be treated preferentially in the event of a conflict or collision between data provided by two different sources.

In some examples, when a user of a recurring revenue management system is presented (e.g. via a display element of a computing device) with a user interface view including information retained in an asset data model 400, a visual indication can be provided to indicate a data quality score associated with the data objects containing the presented information. In this manner, information contained in those objects flagged or otherwise identified as potentially suspect or unreliable can be readily apparent to the user so that he or she can assess the appropriate degree of confidence with which the presented information can be used, for example in on-going service asset sales activities.

Figure 5:
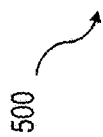
FIG. 5, FIG. 6, and FIG. 7 each show screenshot views illustrating features of user interfaces consistent with implementations of the current subject matter.
Figure 6:

FIG. 5 shows a screenshot view 500 of a user interface displaying parameters and information relating to a logged data generation (e.g. a data import) job. Various statistics can be displayed, such as for example timing of the data generation job, its status, a batch load identifier, and a collection by collection listing 502 of data records loaded and status updates such as link errors, pending, bad/good, etc. The screenshot view 600 of the user interface shown in FIG. 6 illustrates a data quality scoring feature 602 that can be displayed in association with a list of recurring revenue assets. Information assigned a low data quality metric score can be quickly identified, and a user of the system can know to focus his or her data quality improvement efforts on this information to improve the overall quality of the data retained in the asset data model.

As shown in FIG. 6, the data associated with the various assets can be scored according to various factors that are expected to affect quality of the predictions, opportunities, etc. derived from the underlying data. Data quality scoring can be used for a variety of purposes including one or more of guidance of manual, user-driven data enhancement efforts through UI controls that can filter and sort objects such as assets by their data quality; automated data enrichment processes that repair or enrich objects; segmentation of assets to ensure that opportunity generation is only executed on records of requisite quality; and the like.

As noted above, the asset data model 400 can also support real-time (or at least nearly or approximately real-time) reporting and interpretation of service assets, installed base, total asset value, projected revenue, and data quality as well as subscriptions planning (e.g. evaluating, categorizing, and prioritizing subscriptions) to drive sales programs, opportunity generation (e.g. creating opportunities based on installed base or subscription planning outcomes. In this manner, the asset data model 400 can be used in generation of offers and opportunities, for example based on inter-data object relationships and information that can be included in or derived from the asset data model 400. This additional information can include, but is not limited to exclusion rules; expiration window filters; product, customer, or region filters; target selling periods, upsell and cross-sell opportunities, upgrade requirements, expected outcome analysis, and the like. Aggregate asset analysis based on the information described above can be used to support a variety of business decision-making functions. This aggregate asset analysis can optionally include one or more of long range forecasting of future service revenue, comparative analysis of service product profitability, end of service planning, and the like.

Figure 7:
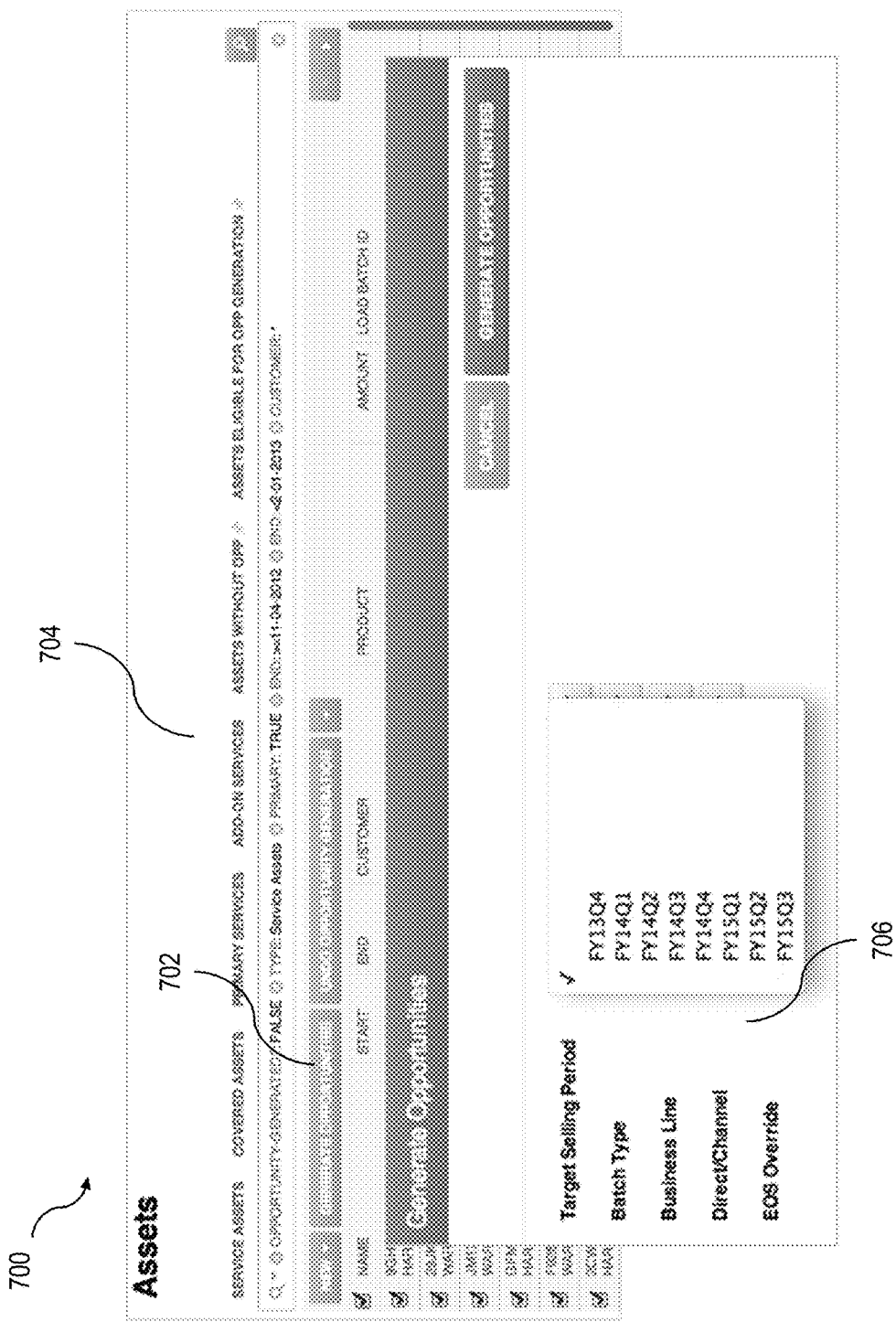

FIG. 7 shows a screenshot view 700 of a user interface in which selection of a "generate opportunities" user interface element 702 in an assets view 704 triggers an opportunity generation sub-view 706. In the opportunity generation sub-view 706, a user can set parameters such as a target selling period, a batch type, a business line, whether the sales are direct or via a channel, and whether an end of service (EOS) override should be set.

Opportunity assignment features consistent with implementations of the current subject matter can include opportunity filtering and bulk editing support, for example to correct or update data in the asset data model 400.

Figure 8:
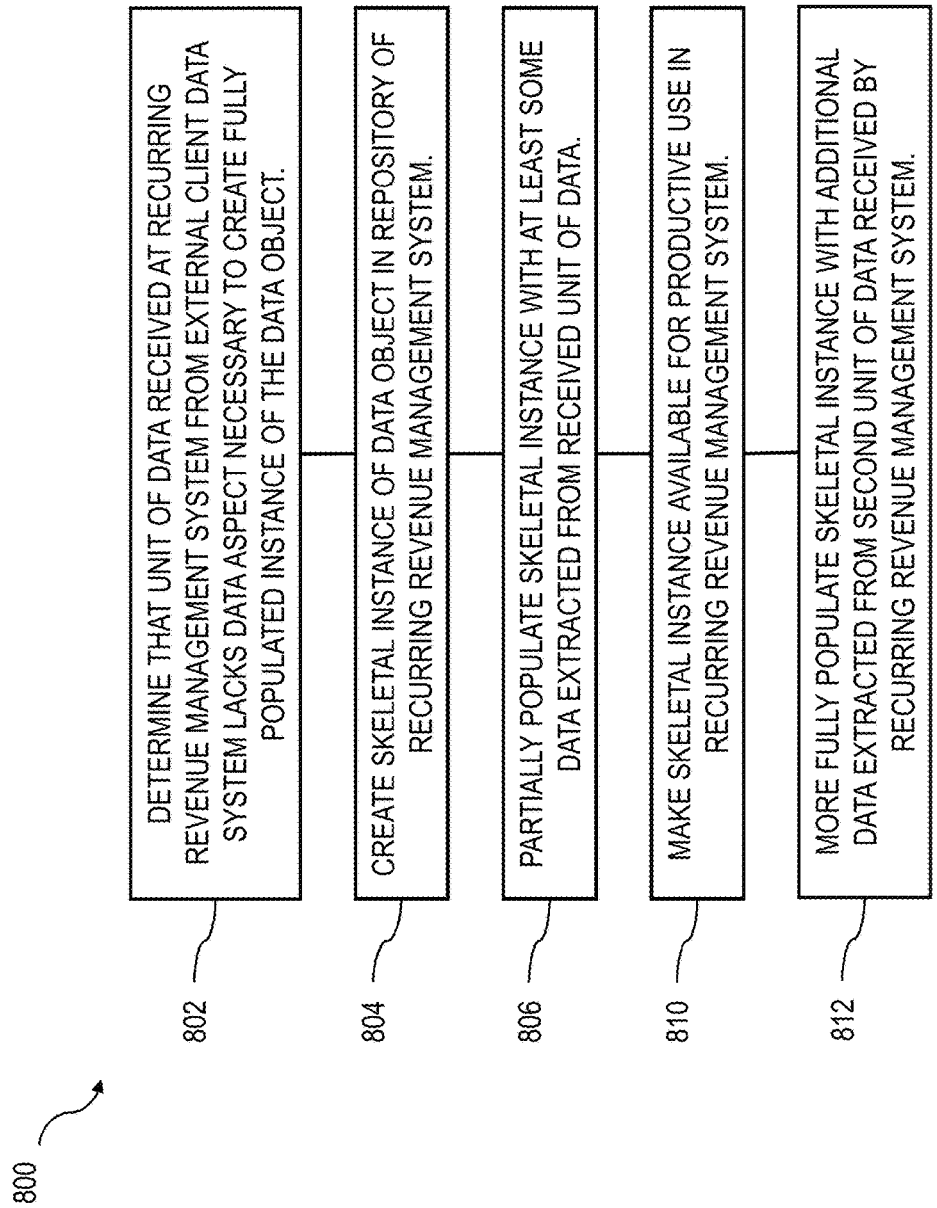
FIG. 8, FIG. 9, and FIG. 10 each show process flow charts illustrating features of methods consistent with implementations of the current subject matter.

FIG. 8 shows a process flow chart 800 illustrating features of a method in which operations consistent with one or more implementations of the current subject matter can process incoming data records received from disparate data sources. At 802 a unit of data received at a recurring revenue management system from an external client system is determined to lack at least one data aspect that is necessary for a fully populated instance of the data object. This determination can include comparison of content of the unit of data to a structure of the data object. At 804, a skeletal instance of an asset data model data object is created. The structure of the data object can be defined to support functionality of a asset data model of a recurring revenue management system 202 as discussed above.

The skeletal instance is partially populated with at least some data extracted from the received unit of data at 806. The skeletal object instance can be sufficient to support one or more recurring revenue asset sales and renewal functions of the recurring revenue management system, such as for example those discussed above, and is available for productive use despite being incomplete relative to a fully populated instance of the data object. At 810 the partially populated instance is made available for productive use in the recurring revenue management system. At 812, upon detection of receipt of a second unit of data relating to more fully populate the skeletal instance of the data object, additional data are extracted from the second unit of data and added to the skeletal instance, which can be kept in productive use.

The additional data can optionally be added to a second instance of the skeletal object, and the first and second instances of the skeletal object can be combined into a single instance of the data object using one or more de-duplication, data conflict resolution, and data quality analysis approaches such as for example those discussed above. The first and the second instances of the skeletal object can each include an external identifier string added as annotations to the first and the second instances of the skeletal objects at load time. These external identifier strings can be matched for the first and second instances of the skeletal object, which can indicate that the first and the second instances are related, for example applicable to completing of a same data object associated with a product (covered asset), service asset, opportunity, contact, etc.

Figure 9:
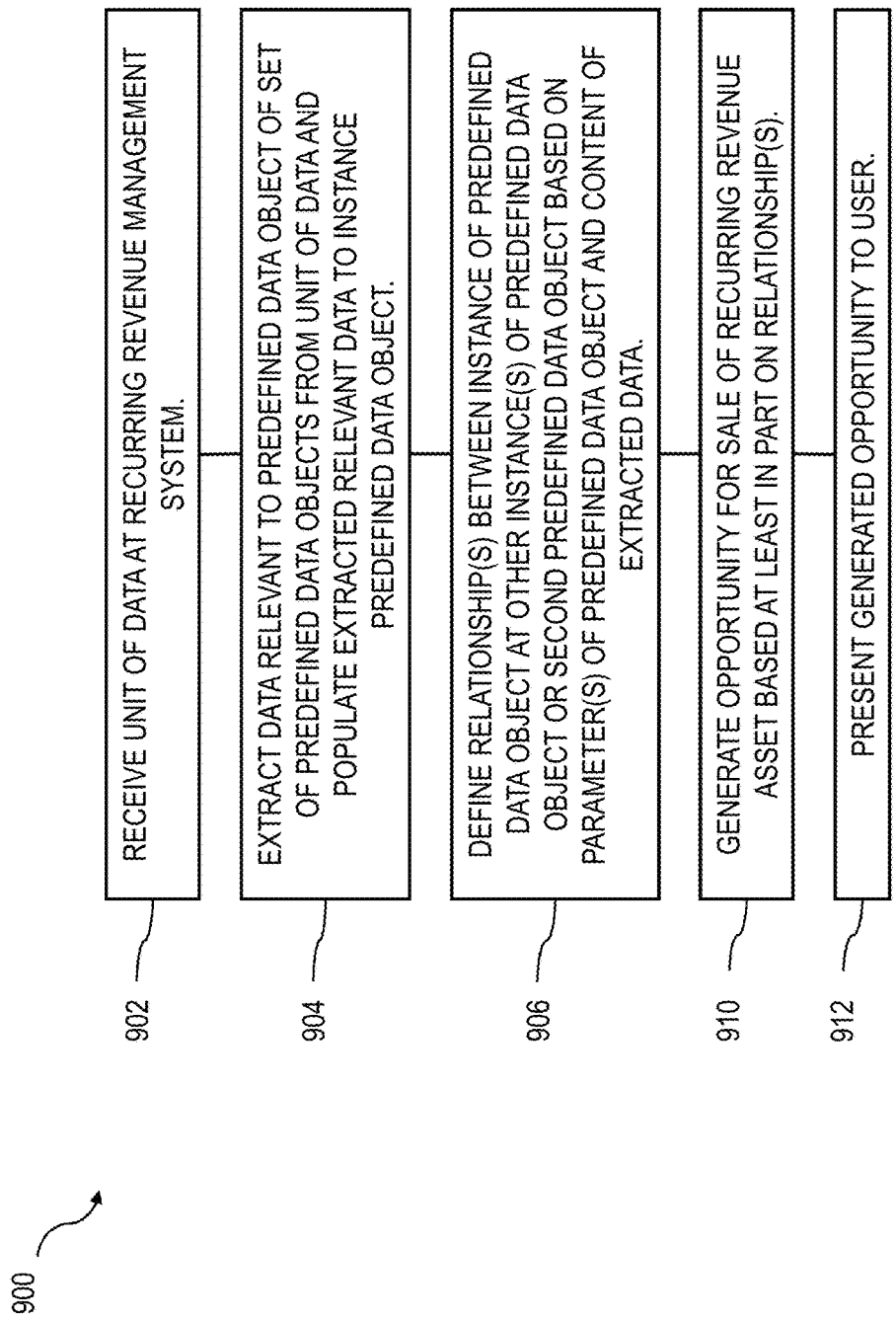

FIG. 9 shows a process flow chart 900 illustrating features of a method in which operations consistent with one or more implementations of the current subject matter can generate an asset data model. At 902, a unit of data is received at a recurring revenue management system. The received unit of data can be received from one or more of an external source of recurring revenue management data, a user of the recurring revenue management system (e.g. as a user input), etc. Data relevant to at least one of a set of predefined data objects are extracted from the unit of data and populated to an instance of one of the set of predefined data objects at 904.

At 906, based on one or more parameters of the predefined data object and the content of the extracted data, one or more relationships are defined between the instance of the predefined data object and at least one other instance of the predefined data object or a second predefined data object of the set of predefined data objects. As an example, a relationship can be directly derived from information that exists in the external source. In another example, a relationship is inferred or generated based on the extracted data. Inference of a relationship can include applying at least one of applying a transitivity analysis between the instance of the predefined object and two or more other data objects in the asset data model, and an automated instantiation of a new inverse relationship based on a direct or inferred existing relationship between the instance and one or more other data objects in the asset data model.

At 910, based at least in part on the one or more relationships, an opportunity for sale of a recurring revenue asset is generated. The opportunity can include one or more offers that relate to renewal of one or more service assets associated with asset data objects in the asset data model, the one or more service assets can optionally have expiration dates that occur within a current or upcoming sales period. At 912 the generated opportunity is presented to a user.

Figure 10:
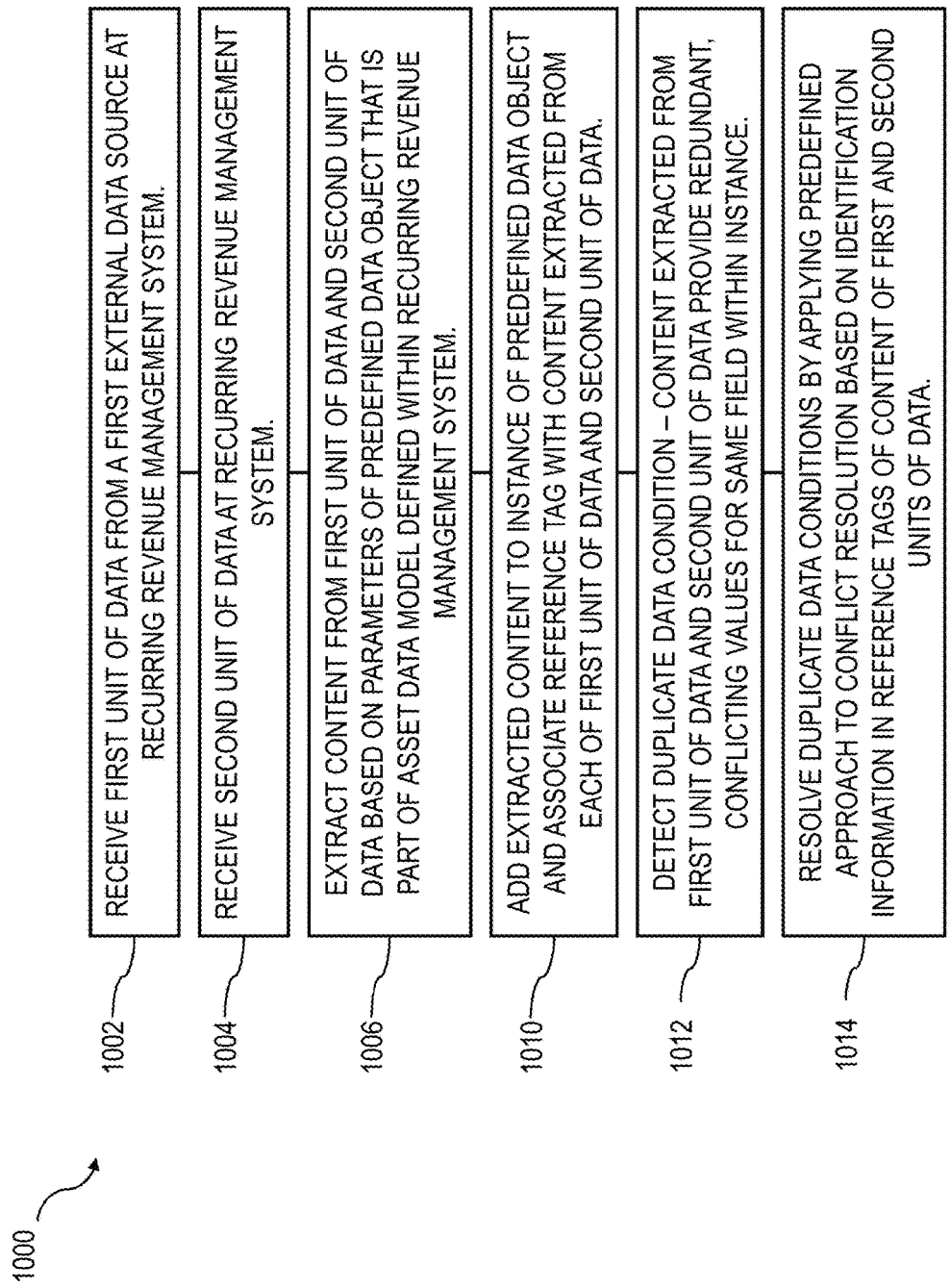

FIG. 10 shows a process flow chart 1000 illustrating features of a method in which operations consistent with one or more implementations of the current subject matter can process incoming data records received from disparate data sources. At 1002 a first unit of data is received from a first external data source at a recurring revenue management system. A second unit of data is received at the recurring revenue management system at 1004. At 1006, at least some content is extracted from the first unit of data and the second unit of data based on parameters of a predefined data object that is part of an asset data model defined within the recurring revenue management system.

The extracted content is added at 1010 to an instance of the predefined data object and a reference tag is associated with the content extracted from each of the first unit of data and the second unit of data. The reference tag includes identification information for the associated content, such as for example one or more of a data source providing the unit of data, a time of arrival or creation of the unit of data, etc. At 1012, a duplicate data condition is detected in which content extracted from the first unit of data and the second unit of data provide redundant, conflicting values for a same field within the instance of the predefined data object.

At 1014, the duplicate data condition is resolved by applying a predefined approach to conflict resolution based on the identification information contained in the reference tags of the content of the first and second units of data. In some examples, the predefined approach can include use of one or more identified key fields appearing in the first unit of data and the second unit of data. The one or more key fields can have a uniqueness property that is known a priori. In another example, a clustering algorithm can be applied to identify likely duplication based on one or more measurements of statistical anomaly relative to a larger group of objects in the asset data model.

Figure 11:
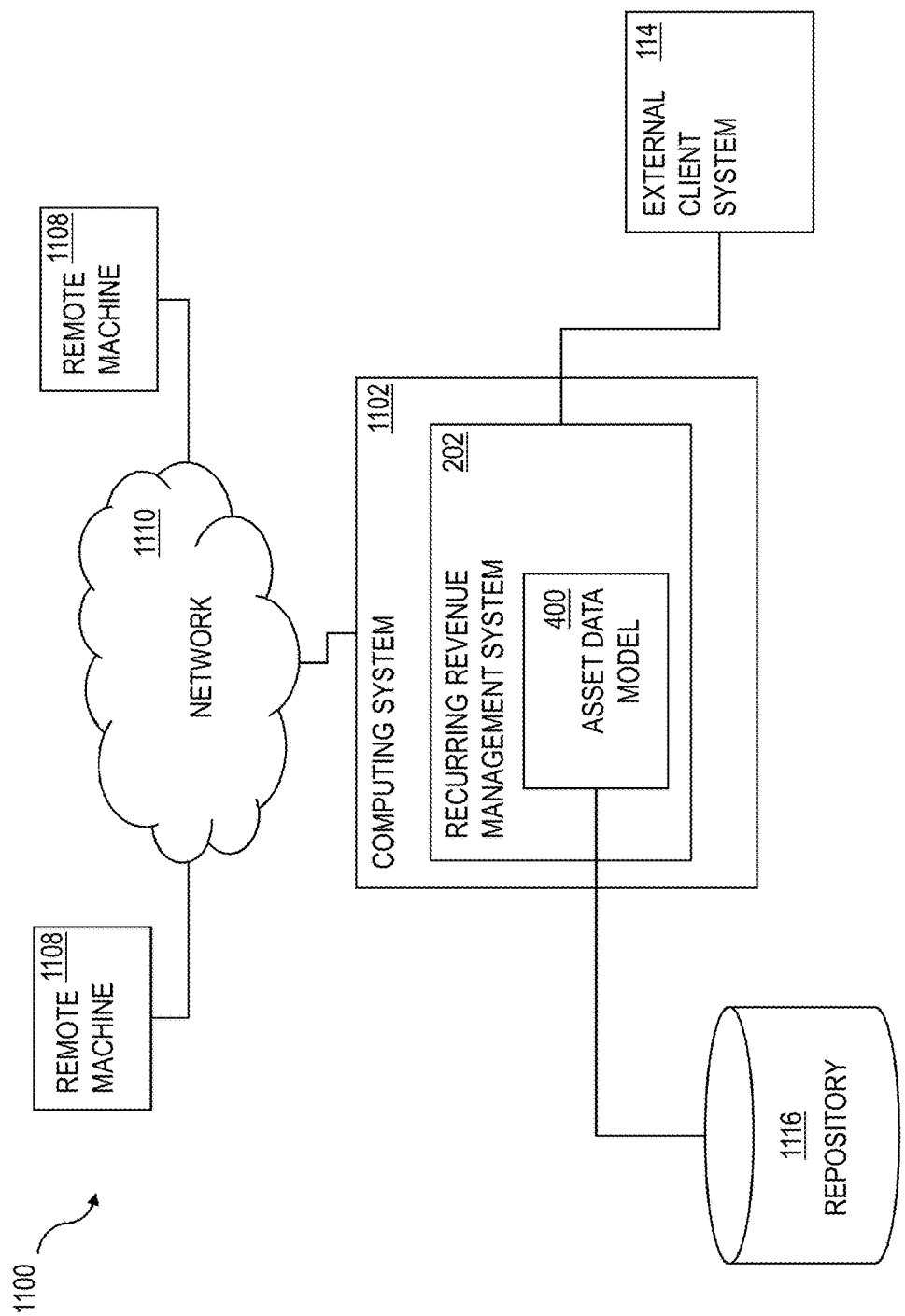
FIG. 11 shows an example of a computing landscape having one or more features that can be included in implementations of the current subject matter.

FIG. 11 shows a diagram of a computing landscape consistent with one or more implementations of the current subject matter. A computing system 1102 can perform operations, execute code, or otherwise implement a recurring revenue management system 202. The recurring revenue management system 202, which can include a asset data model 400, provides one or more features as discussed above. The computing system 1102 can be accessed by one or more remote machines 1108, for example via a direct connection, a local terminal, or over a network 1110 (e.g. a local area network, a wide area network, a wireless network, the Internet, or the like). External client systems 114 can also be access via direct connections and/or over the same network 1110 or one or more other networks. The asset data model 400 and recurring revenue management system 202 can be in contact with one or more repositories 1116, again either via direct connection and/or over the same network 1110 or one or more other networks. Aspects of the current subject matter can also be provided via a multi-tenant environment, in which data records, etc. of multiple client organizations are retained on a common repository or set of repositories while being isolated from access except by the owner of the specific data records, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. For example, any references to methods, algorithms, calculations, receiving data, sending data, storing data, other data processing tasks or the like can include the execution of such operations at least in part by at least system, each of which includes at least one programmable processor. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example, a liquid crystal display (LCD), or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
receiving a first unit of data at a recurring revenue management system;
receiving a second unit of data at the recurring revenue management system;
extracting content from the first unit of data and the second unit of data based on one or more parameters of a predefined data object that is part of an asset data model defined in the recurring revenue management system;
adding the extracted content to an instance of the predefined data object and associating reference tags with the content extracted from each of the first unit of data and the second unit of data, each reference tag comprising identification information for its associated content, wherein the identification information of each reference tag comprises an indication of a source from which the associated extracted content was received, the source comprising one of a plurality of disparate data sources, the identification information further comprising a tag history including a history of previous reference tags that have been associated with the extracted content with which the reference tag is associated, the tag history configured to provide the history and source of origin of all changes to the associated extracted content;
detecting a duplicate data condition in which the content extracted from the first unit of data and the content extracted from the second unit of data provide redundant, conflicting values for a same field within the instance of the data object; and
resolving the duplicate data condition based on the indication of the source from which the associated extracted content was received and the history of previous reference tags that have been associated with the extracted content with which the reference tag is associated in the identification information of the reference tags.

2. The computer program product in accordance with claim 1, wherein resolving the duplicate data condition based on the indication of the source from which the associated extracted content was received and the history of previous reference tags that have been associated with the extracted content with which the reference tag is associated in the identification information of the reference tags comprises identifying one or more key fields in the content, each of the one or more key fields having a uniqueness property.

3. The computer program product in accordance with claim 1, wherein resolving the duplicate data condition based on the indication of the source from which the associated extracted content was received and the history of previous reference tags that have been associated with the extracted content with which the reference tag is associated in the identification information of the reference tags comprises a clustering algorithm to measure one or more statistical anomalies relative to a larger group of object in the asset data model.

4. The computer program product in accordance with claim 1, wherein the asset data model comprises one or more of each of product data objects, recurring revenue asset data objects, opportunity data objects, and contact data objects.

5. The computer program product in accordance with claim 4, wherein the content extracted from the first unit of data and the second unit of data represents one or more of each of product data, recurring revenue asset data, opportunity data, and contact data.

6. The computer program product in accordance with claim 1, wherein the operations further comprise generating an asset data object of a recurring revenue asset according to the resolving of the duplicate data condition.

7. The recurring revenue management system in accordance with claim 1, wherein the operations further comprise an operation to generate an asset data object of a recurring revenue asset according to the resolving of the duplicate data condition.

8. The computer program product of claim 1, wherein the plurality of disparate data sources comprises two or more of an entitlement system, an order management system, a pricing system, a product master database, a sales force automation system, a customer master database 216, or a contract management system.

9. A recurring revenue management system comprising:
at least one programmable processor; and
a machine-readable medium storing instructions that, when executed by the at least one processor, cause the at least one programmable processor to perform operations comprising:
receive a first unit of data;
receive a second unit of data;
extract content from the first unit of data and the second unit of data based on one or more parameters of a predefined data object that is part of an asset data model defined in the recurring revenue management system;
add the extracted content to an instance of the predefined data object and associating reference tags with the content extracted from each of the first unit of data and the second unit of data, each reference tag comprising identification information for its associated content, wherein the identification information of each reference tag comprises an indication of a source from which the associated extracted content was received, the source comprising one of a plurality of disparate data sources, the identification information further comprising a tag history including a history of previous reference tags that have been associated with the extracted content with which the reference tag is associated, the tag history configured to provide the history and source of origin of all changes to the associated extracted content;
detect a duplicate data condition in which the content extracted from the first unit of data and the content extracted from the second unit of data provide redundant, conflicting values for a same field within the instance of the data object; and
resolve the duplicate data condition based on the indication of the source from which the associated extracted content was received and the history of previous reference tags that have been associated with the extracted content with which the reference tag is associated in the identification information of the reference tags.

10. The recurring revenue management system in accordance with claim 9, wherein resolving the duplicate data condition based on the indication of the source from which the associated extracted content was received and the history of previous reference tags that have been associated with the extracted content with which the reference tag is associated in the identification information of the reference tags comprises identifying one or more key fields in the content, each of the one or more key fields having a uniqueness property.

11. The recurring revenue management system in accordance with claim 9, wherein resolving the duplicate data condition based on the indication of the source from which the associated extracted content was received and the history of previous reference tags that have been associated with the extracted content with which the reference tag is associated in the identification information of the reference tags comprises a clustering algorithm to measure one or more statistical anomalies relative to a larger group of object in the asset data model.

12. The recurring revenue management system in accordance with claim 9, wherein the asset data model comprises one or more of each of product data objects, recurring revenue asset data objects, opportunity data objects, and contact data objects.

13. The recurring revenue management system in accordance with claim 12, wherein the content extracted from the first unit of data and the second unit of data represents one or more of each of product data, recurring revenue asset data, opportunity data, and contact data.

14. A computer-implemented method comprising:
receiving, by one or more processors, a first unit of data related to a recurring revenue asset;
receiving, by the one or more processors, a second unit of data related to the recurring revenue asset;
extracting, by the one or more processors, content from the first unit of data and the second unit of data based on one or more parameters of a predefined data object that is part of an asset data model defined in a recurring revenue management system for the recurring revenue asset;
adding the extracted content to an instance of the predefined data object and associating reference tags with the content extracted from each of the first unit of data and the second unit of data, each reference tag comprising identification information for its associated content, wherein the identification information of each reference tag comprises an indication of a source from which the associated extracted content was received, the source comprising one of a plurality of disparate data sources, the identification information further comprising a tag history including a history of previous reference tags that have been associated with the extracted content with which the reference tag is associated, the tag history configured to provide the history and source of origin of all changes to the associated extracted content;
detecting, by the one or more processors, a duplicate data condition in which the content extracted from the first unit of data and the content extracted from the second unit of data provide redundant, conflicting values for a same field within the instance of the data object; and
resolving, by the one or more processors, the duplicate data condition indication of the source from which the associated extracted content was received and the history of previous reference tags that have been associated with the extracted content with which the reference tag is associated in the identification information of the reference tags.

15. The computer-implemented method in accordance with claim 14, wherein resolving the duplicate data condition based on the indication of the source from which the associated extracted content was received and the history of previous reference tags that have been associated with the extracted content with which the reference tag is associated in the identification information of the reference tags comprises identifying one or more key fields in the content, each of the one or more key fields having a uniqueness property.

16. The computer-implemented method in accordance with claim 14, wherein resolving the duplicate data condition based on the indication of the source from which the associated extracted content was received and the history of previous reference tags that have been associated with the extracted content with which the reference tag is associated in the identification information of the reference tags comprises a clustering algorithm to measure one or more statistical anomalies relative to a larger group of object in the asset data model.

17. The computer-implemented method in accordance with claim 14, wherein the asset data model comprises one or more of each of product data objects, recurring revenue asset data objects, opportunity data objects, and contact data objects.

18. The computer-implemented method in accordance with claim 17, wherein the content extracted from the first unit of data and the second unit of data represents one or more of each of product data, recurring revenue asset data, opportunity data, and contact data.

19. The computer-implemented method in accordance with claim 14, wherein the operations further comprise generating, by the one or more processors, an asset data object of a recurring revenue asset according to the resolving of the duplicate data condition.

20. The computer program product in accordance with claim 1, wherein each reference tag further comprises one or more of a date of receipt, a user identifier, and a permission level of a user who provided the extracted content.

* * * * *